(No Model.)
W. M. BOURS.
MAP.
No. 379,360. Patented Mar. 13, 1888.
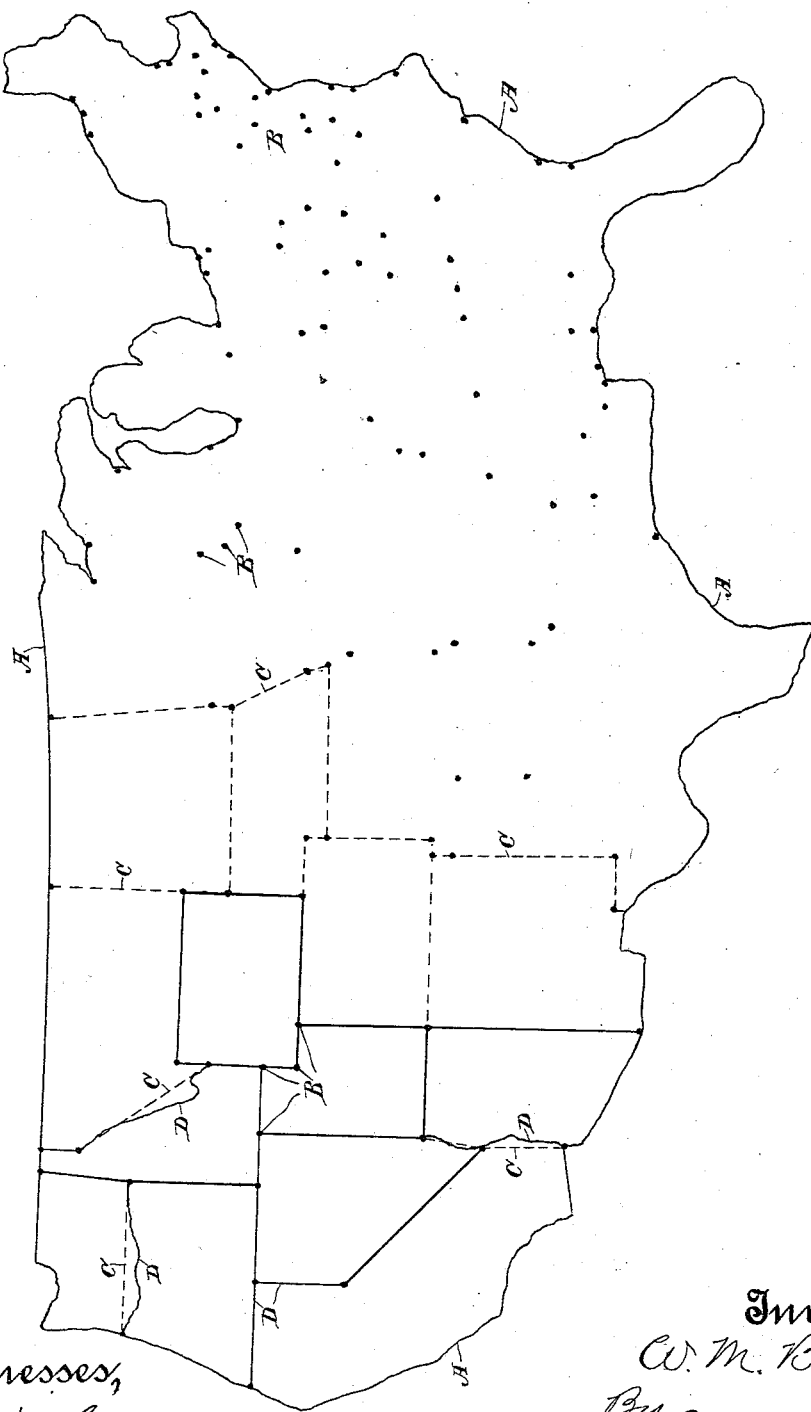

United States Patent Office.

WILLIE M. BOURS, OF STOCKTON, CALIFORNIA.

MAP.

SPECIFICATION forming part of Letters Patent No. 379,360, dated March 13, 1888.

Application filed December 1, 1887. Serial No. 256,722. (No model.)

*To all whom it may concern:*

Be it known that I, WILLIE M. BOURS, of Stockton, San Joaquin county, State of California, have invented an Improvement in a Map or Chart for Teaching Purposes; and I hereby declare the following to be a full, clear, and exact description of the same.

My invention relates to a map or chart for teaching purposes.

It consists of a general outline of the state or country, and within this exterior outline are a series of dots or points so placed that lines drawn through these points will give a general outline of the subdivisions of the country or its configuration, and from these general outlines the more exact indications of the configuration may be drawn.

Referring to the accompanying drawing for a more complete explanation of my invention, the figure is a view showing an outline map or chart with the points or dots, a portion of these dots connected by lines showing the general configuration of the division, and still another portion showing the exact configuration of the coast or other lines drawn through the points.

For the purpose of teaching geography, maps or charts are employed either completed with colored subdivisions or in outline; but these maps often convey wrong impressions to very youthful minds, and for this purpose I have invented my improved map in which the general outline of the whole country is made, and the dots so placed that the pupil can draw the various lines indicating the general shape of the subdivisions and may afterward make the more exact contour-lines therefrom, thus gaining knowledge of the size, proportion, and general appearance which it is impossible to gain from completed maps.

A is the outline of the country to be studied, this outline only following the more prominent irregularities of the coast or boundary. I then mark within this outline points or dots B at such positions that lines drawn from these points or dots will show the general contour of the internal subdivisions of the state or country. By the aid of these dots the pupil will soon learn to construct all the subdivisions of the country which is being studied, first in general outline by drawing approximate straight lines C through these dots, and afterward the more minute irregularities of contour may be indicated by lines, as shown at D.

These outline maps or charts may be permanently drawn or indicated upon a slate or blackboard; or they may be drawn upon silica slate, where the general outlines and dots may be permanent. Connecting outlines or contours may be drawn with a pencil or other marking implement while the lesson is in progress, and afterward again erased so as to leave only the permanent outline and the dots.

This system is of great use to assist the pupil to understand the territorial relations or the divisions of the country, its general appearance as a whole, and due relationship of the various outlines and irregularities of configuration, showing also where the more exact outline of the country varies from the general outline.

Having thus described my invention, what I claim as new, and desire to secure by Letters Patent, is—

1. A map or chart consisting of the permanent general outline of the country, and a series of dots or points whereby the direction and termination of temporary lines showing the subdivisions are indicated, substantially as herein described.

2. An outline map or chart showing the general boundary-lines of the country in permanent lines, and the permanent dots or points marked within said outlines in such position that lines drawn through them will subdivide the country into its smaller divisions, and from these lines the smaller irregularities of outline or contour may be traced more accurately, substantially as herein described.

In witness whereof I have hereunto set my hand.

WILLIE M. BOURS.

Witnesses:
S. H. NOURSE,
H. C. LEE.